US010780637B2

(12) United States Patent
Chen-Iun-Tai

(10) Patent No.: US 10,780,637 B2
(45) Date of Patent: Sep. 22, 2020

(54) 3-D PRINTER IN POLAR COORDINATES

(71) Applicant: Nikita Chen-Iun-Tai, Irkutsk (RU)

(72) Inventor: Nikita Chen-Iun-Tai, Irkutsk (RU)

(73) Assignee: APIS COR ENGINEERING, LLC, Owings Mills, MD (US)

(*) Notice: Subject to any disclaimer, the term of this patent is extended or adjusted under 35 U.S.C. 154(b) by 515 days.

(21) Appl. No.: 15/170,235

(22) Filed: Jun. 1, 2016

(65) Prior Publication Data
US 2016/0361834 A1 Dec. 15, 2016

Related U.S. Application Data

(60) Provisional application No. 62/173,523, filed on Jun. 10, 2015.

(51) Int. Cl.
*B29C 64/241* (2017.01)
*B28B 1/00* (2006.01)
*B33Y 10/00* (2015.01)
*B33Y 30/00* (2015.01)
*B33Y 50/02* (2015.01)
*B33Y 40/00* (2020.01)
(Continued)

(52) U.S. Cl.
CPC ............ *B29C 64/241* (2017.08); *B28B 1/001* (2013.01); *B28B 15/00* (2013.01); *B29C 64/20* (2017.08); *B33Y 10/00* (2014.12); *B33Y 30/00* (2014.12); *B33Y 40/00* (2014.12); *B33Y 50/02* (2014.12); *E04G 11/22* (2013.01)

(58) Field of Classification Search
CPC ....... B28B 1/001; B28B 15/00; B28B 15/002; B33Y 10/00; B33Y 30/00; B33Y 40/00; B33Y 50/00; B33Y 50/02; B33Y 99/00; E04G 11/22; E04G 21/00; E04G 21/02; E04G 21/04; E04G 21/0427; E04G 21/0436; E04G 21/0445; E04G 21/0463; E04G 21/0481; B29C 64/10; B29C 64/20; B29C 64/232; B29C 64/246; B29C 64/241; B29C 64/30; E02D 2250/0015; E02D 2300/0018; E02D 2300/002; E04B 1/16; B25J 9/02; B25J 19/002; E04H 12/18; E04H 12/182; E04H 12/34; F15B 15/16; F05B 2240/9151
USPC .......................................................... 264/31
See application file for complete search history.

(56) References Cited

U.S. PATENT DOCUMENTS 6,823,888 B1    11/2004 Raymond
2007/0028532 A1*  2/2007 Douglas ................ E04H 12/182
                                                        52/118
(Continued)

FOREIGN PATENT DOCUMENTS

CN    204725856 U    10/2015
GB    2510598 A   *  8/2014    .......... B29C 64/112

Primary Examiner — Robert C Dye
Assistant Examiner — Sedef E Paquette
(74) Attorney, Agent, or Firm — Nadya Reingand; Yan Hankin

(57) ABSTRACT

This invention is in the field of automated 3D printing of buildings or structures and method of its operation. A 3D printer having an extendable boom arm with an extruder for extruding a concrete-based chemical solution moves with translational and rotational motion in an XOY plane. The extendable boom arm is mounted such that it is capable of height adjustment in a XOZ plane. The invention also regards a method for automated 3D printing of a building or structure using the 3D printer.

9 Claims, 7 Drawing Sheets

(51) Int. Cl.
*E04G 11/22* (2006.01)
*B28B 15/00* (2006.01)
*B29C 64/20* (2017.01)

(56) References Cited

U.S. PATENT DOCUMENTS

| | | |
|---|---|---|
| 2011/0095949 A1 | 8/2011 | Wong |
| 2011/0304414 A1 | 12/2011 | Dumoux |
| 2011/0309213 A1 | 12/2011 | Navarro et al. |
| 2014/0252668 A1* | 9/2014 | Austin .................. B28B 3/20 |
| | | 264/40.7 |
| 2016/0107332 A1 | 4/2016 | Grivetti |

* cited by examiner

3-D PRINTER IN POLAR COORDINATES

CROSS-REFERENCE TO RELATED APPLICATIONS

This patent application claims priority to, and incorporates fully by reference, U.S. Provisional Patent Application No. 62/173,523, titled "3-D Printer in Polar Coordinates" filed Jun. 10, 2015.

BACKGROUND OF THE INVENTION

Field of the Invention

This invention is in the field of building construction. Particularly the invention concerns a system and structure for automated three-dimensional construction of buildings and structures using a concrete-based chemical solution.

Background Art

Application CN 103,786,235 A by Liao Xuan Mao et al. discloses a tower-type 3D printer with a tower crane, a material adding system, a control system, a maneuvering system, a material guide pipe, and a printing system. The disclosed invention relies on a catheter, laser, and temperature control head. The disclosed, invention is for making small parts that can be organized into large entities. The use of a concrete-based chemical solution is not disclosed.

Application US 2014/0,252,668 by Austin et al. discloses an apparatus for performing a multi-layer construction method using cementitious material has a reservoir for containing cementitious material; the reservoir is coupled to a print head with a delivery nozzle; the delivery nozzle can be moved by a robotic arm assembly to index the nozzle along, a predetermined path; flow of the cementitious material from the reservoir to the nozzle and to extrude the material out of the nozzle is controlled in conjunction with indexing of the nozzle; a support material, an accelerating agent and a cartilage material may also be deposited from the print head. The application does not disclose using one supporting pole for up and down motion, on which telescoping mechanism is attached, the arm moves in one plane parallel to the ground.

Application EP 2610,417 by Khoshnevis discloses an apparatus for automated construction with an extrusion nozzle and a robotic arm. The apparatus has a nozzle assembly configured to extrude material through an outlet; and a controllable robotic arm coupled to the nozzle assembly, the robotic arm having at one end a gripper configured to pick up an element and deposit the element at a desired position relative to the extruded material. The application does not disclose using one supporting pole for up and down motion, on which telescoping mechanism is attached, the arm moves in one plane parallel to the ground.

Patent CN 204136193 by Zhang Yuan Ming, et al. discloses a print-based concrete plaster mold ceramic slurry of solid freeform fabrication machine. The printer includes a printing apparatus line of the mold, filling, the slurry feed printing apparatus and multi-degree of freedom robot arm movement mechanism. Line printing means for printing the mold body and the mold support portion. Slurry feed filling apparatus comprises an ultrasonic slurry nozzle rapping, vacuum filter the slurry, the slurry bypass device, the slurry pressure shiny pump and agitator. After the slurry was uniformly stirred and remove excess water and gas, at a controlled flow rate and pressure of the incoming ultrasonic nozzle rapping pier real shiny is filled. Print mold layer by layer until the model outline and filling, paste printing is complete, remove the mold envelope to obtain the desired components. The main solution to the complex structure of the solid slurry freeform problems. Printer without mold, low cost, production speed, can be used to quickly customize various sculptures statues, ceramic structural pans, as well as art complex structures. The patent does not disclose using one supporting pole for up and down Motion, on which telescoping mechanism is attached, the arm moves in one plane parallel to the ground using a cylindrical coordinate system.

Patent CN 204054670 by Wang Meihua et al. discloses a utility model providing a 3D printing device capable of realizing polar coordinate positioning for a building. A circular track beam is horizontally built on stilts by virtue of a plurality of supports, a printing head cross beam passes through the center of a circle of the circular track beam, both ends of the printing head cross beam are respectively in sliding connection with the circular track beam, the printing head cross beam can rotate in a plane on which the circular track beam is positioned around the center of the circle of the circular track beam, a printing head rod is mutually perpendicular to the circular track beam, one end of the printing head rod is in sliding connection with the printing head cross beam, a priming head is arranged on the other end of the printing head rod which can extend to drive the priming head to move up and down, and the printing head can linearly move along the printing head cross beam along with the printing head rod. By using the 3D printing device, the printing head can be positioned in a form of a polar coordinate system, and compared with a 3D printing device based on a rectangular coordinate system for a building, the 3D printing device has the advantage of high printing precision and efficiency. The patent does not disclose using, one supporting pole for up and down motion, on which telescoping mechanism is attached, the arm moves in one plane parallel to the ground using a cylindrical coordinate system.

SUMMARY OF THE INVENTION

The invention consists of an automated device for constructing, buildings and structures by a method of three-dimensional printing using concrete-based chemical solution.

The invention is different from 3D printer for printing portal-type homes because the device is located in the center of the work zone (starting coordinate, 0) and carries out rotational (303) and translational (103) motions in XOY plane, resulting in extruder (101A; 101B) movement along the specified trajectory (105). Thus, during transformation of the construction from position 201 to position 301, the extruder travels the path from point 101A to point 101B, extruder travel is entered in polar coordinate system, wherein projection of extruder (101A; 101B) position onto the XOY plane is determined by its distance from the axis of rotation (starting coordinate, 0) with angle of its radius-vector to abscissa ($\phi'$; $\phi''$).

The invention also differs from 3D printer with manipulator-type arm due to the extendable boom arm of the device consisting of a telescoping mechanism, but the device does not consist of segments, each of which is connected with the next segment by a joint, relative to which the motion of these segments is carried out.

Embodiment 1

In addition to the translational and rotational motion in the XOY plane, the device carries out translational motions along the Z axis during the printing process, as a result of which the extruder can be raised and lowered, taking up different vertical positions. The height of the extruder is determined in the XOZ plane by its applicate (its coordinate on the Z axis), or by the distance from it to the XOY plane in space.

The given design allows printing a construction, encompassing the surroundings out to a radius of 20 meters, with center at the point where coordinates start.

The rotation mechanism is located where the extendable boom arm meets the lift mechanism, so that during printing process only the extendable boom arm and nodes touching it rotate. Telescoping-type lift mechanism does not rotate, it is the base of the construction.

The device does not need its base to be anchored to a support, since it includes a counterweight mechanism, which corrects the overall center of mass during extendable boom arm movements such that it coincides with the axis of rotation. This correction is performed by the movement of the load of the counterweight mechanism in the specified direction.

Rotation mechanism is located at the junction of the extendable boom arm and printer lift node, providing the following in addition to its primary function:
1. Transmitting the electrical signal from control node to the motors;
2. Feeding the solution from the plastering station to the extruder; and
3. Transmitting miscellaneous communications from the base to the rotating part.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—extruder has a special rotary trowel device, which provides high quality printing surface, which does not need additional cleaning. In addition to this, the design of the extruder is such that it can change the direction of the nozzle, which allows it to print not only straight, but also curved, spherical sections.

Embodiment 2 in addition to the translational and rotational motion in the XOY plane, the device carries out translational motions along the Z axis during the printing process, as a result of which the extruder can be raised and lowered, taking up different vertical positions. The height of the extruder is determined in the XOZ plane by its applicate (its coordinate on the Z axis), or by the distance from it to the XOY plane in space. The given design allows printing a construction, encompassing the surroundings out to a radius of 20 meters, with center at the point where coordinates start.

The rotation mechanism is located in the base of the whole construction, wherein during the printing process, the extendable boom arm and all nodes touching it (counterweight mechanism, extruder, etc.) rotate, as does the lift mechanism, presented in the form of a truss.

The device does not need its base to be anchored to a support, since it includes a counterweight mechanism, which corrects the overall center of mass during extendable boom arm movements such that it coincides with the axis of rotation. This correction is performed by the movement of the load of the counterweight mechanism in the specified direction.

Rotation mechanism (801A) is located in the base of the construction, providing:
1. Transmitting the electrical signal from control node to the motors;
2. Feeding the solution from the plastering station to the extruder; and
3. Transmitting miscellaneous communications from the base to the rotating part.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—extruder has a special rotary trowel device, which provides high quality printing surface, which does not need additional cleaning. In addition to this, the design of the extruder is such that it can change the direction of the nozzle, which allows it to print not only straight, but also curved, spherical sections.

The lift mechanism consists of truss, mounted on the rotation mechanism. Extendable boom arm and all nodes touching it (counterweight mechanism, extruder, etc.) perform necessary movements along this truss. Special mounts on the end of the truss allow building up of the truss, as a result of which it is possible to print second and subsequent floors of a building, the quantity of which depends on device dimensions.

BRIEF DESCRIPTION OF THE DRAWINGS

The present invention will now be discussed in further detail below with reference to the accompanying figures in which.

DETAILED DESCRIPTION OF THE PREFERRED EMBODIMENTS

Figure 1:
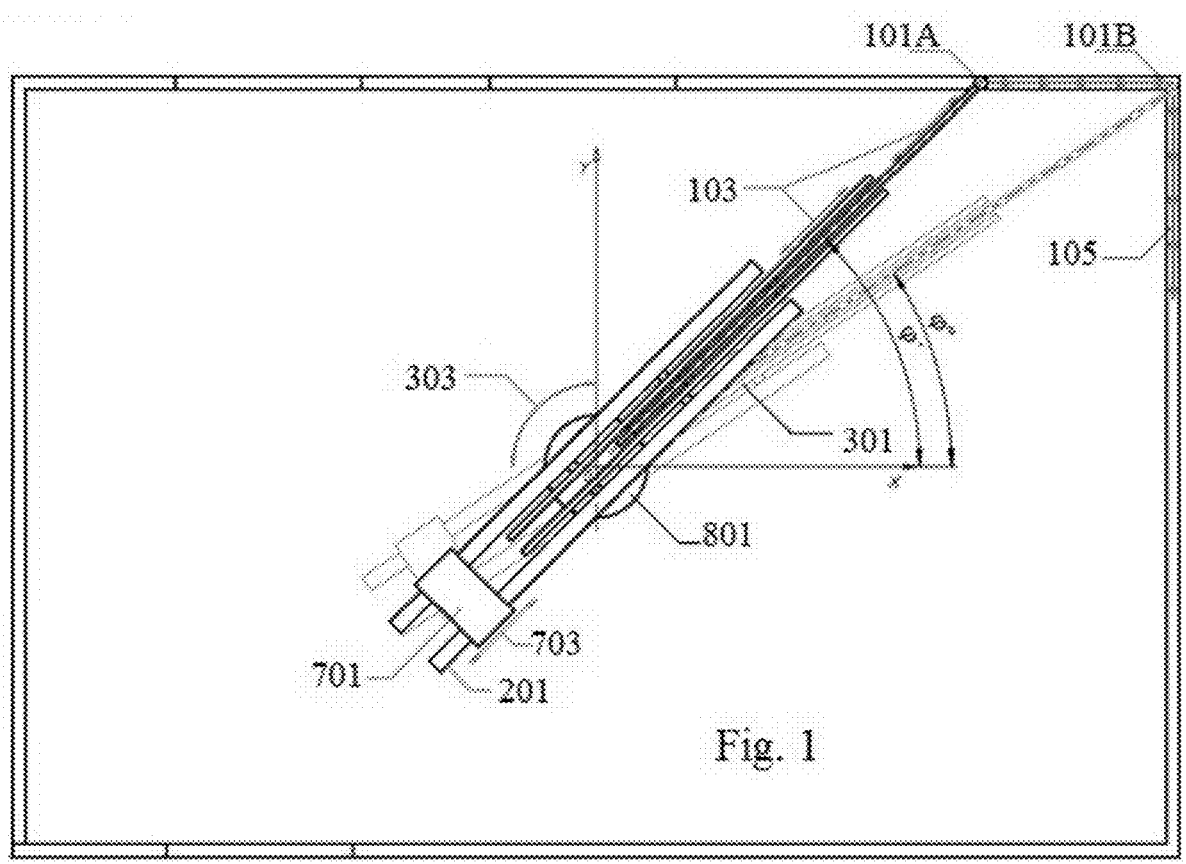
FIG. 1 shows operation of the 3D minter in the X and V plane.

FIG. 1 shows the 3D printer in operation as in the X and Y plane. The 3D printer is configured to automatically build a structure for which it has been given design schematics for. The 3D printer has a rotation mechanism 801A. Mounted to the rotation mechanism 801A is an extendable boom arm 201 with telescoping extendable sections 301. The extendable boom arm 201 with extendable sections 301 are only capable of translational motion 103 extending and contracting the reach. The extendable sections 301 are not like segments of a robotic arm wherein the section have full independent movement relative to one another. The center of rotation mechanism 801A is located a point 0, 0 of an X and V coordinate system. At the end of the extendable sections 301 there is an extruder 1401 (FIGS. 2, 4, and 5) which moves from point 101A to point 101B during deposition of a concrete-based chemical solution.

The 3D is located in the center of the work zone (starting coordinate, 0) and carries out rotational 303 and translational 103 motions in XOY plane, resulting in extruder 1401 moving along points 101A and 101B while completing a specified trajectory 105. Thus, during transformation of the construction from one position to another position, the extruder 1401 travels the path from point 101A to point B, extruder travel is entered in polar coordinate system, wherein projection of extruder 1401 position onto the XOY plane is determined by its distance from the axis of rotation (starting coordinate, 0) with angle of its radius-vector to abscissa φ' to φ".

Embodiment 1

Figure 2:
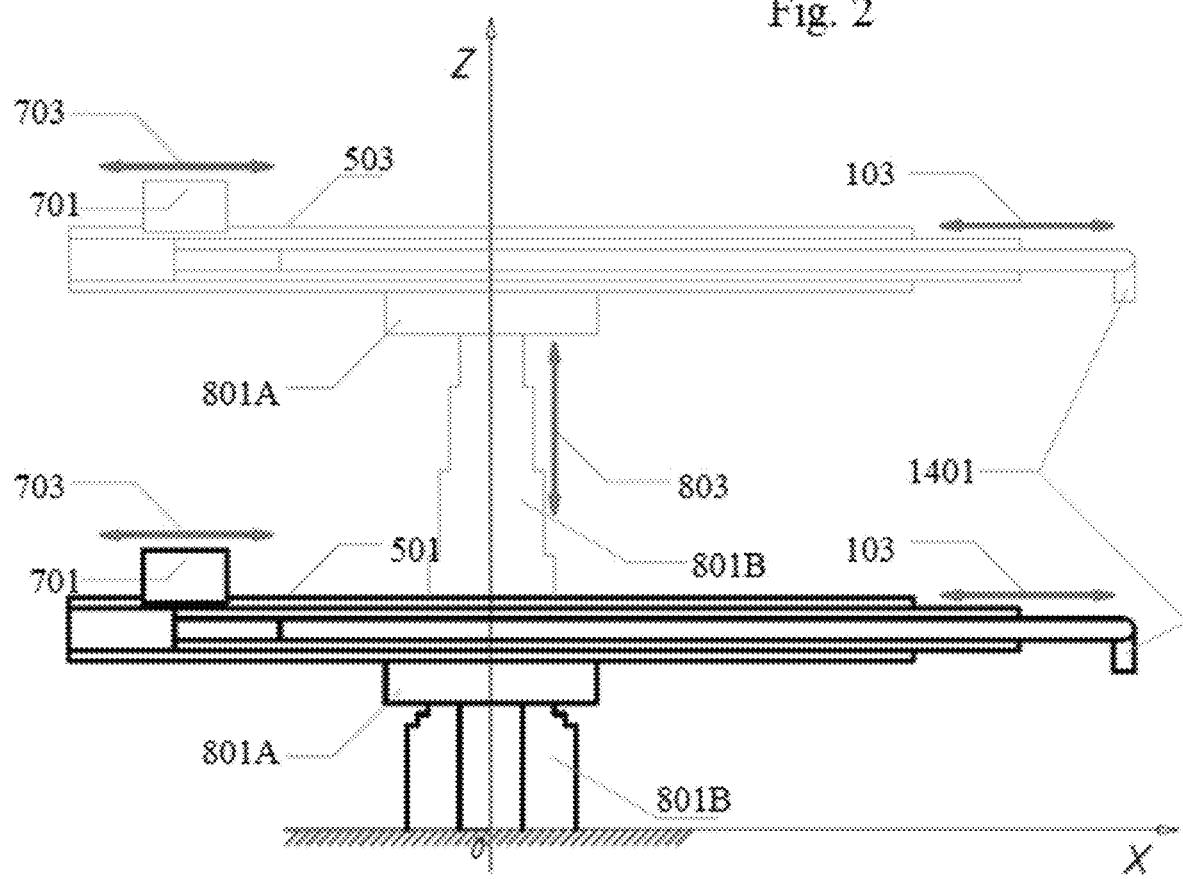
FIG. 2 shows operation of the 3D printer in the X and Z plane.

Referring to FIG. 1 and FIG. 2, in addition to the translational 103 and rotational 303 motion in the XOY plane, the device carries out translational motions 803 along the Z axis during the printing process, as a result of which the extruder 1401 can be raised and lowered, taking up positions at 501 or 503, respectively. The height of the extruder 1401 is determined in the XOZ plane by its applicate (its coordinate on the Z axis), or by the distance from it to the XOY plane in space.

In a preferred embodiment the design allows printing a construction, encompassing the surroundings out to a radius of 20 meters, with center at the point where coordinates start. In alternative embodiments the radius is greater than 20 meters.

In this embodiment the rotation mechanism 801A is located between extendable boom arm 201 with telescoping extendable sections 301 with extruder 1401 and telescoping-type lift mechanism 801B, so that during printing process only the extendable boom arm and nodes touching it rotate. Telescoping-type lift mechanism 801B does not rotate, it is the base of 3D printer.

The 3D printer does not need its base to be anchored to a support, since it includes a counterweight mechanism 701, which corrects the overall center of mass during extendable boom arm movements 103 such that it coincides with the axis of rotation Z. This correction is performed by the movement of the load of the counterweight mechanism 701 in the specified direction 703.

Rotation mechanism 801A is located at the junction of the extendable boom arm 201 with telescoping extendable sections 301 and printer lift node, the telescoping-type lift mechanism 801B, providing the following in addition to its primary function:
1. Transmitting the electrical signal from control node to the motors;
2. Feeding a dry mixture into a combination concrete mixture and pump 2101 (FIG. 5) to the extruder 1401; and
3. Transmitting miscellaneous communications from the base to the rotating extendable boom arm 201.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—extruder 1401 has a special rotary trowel device (not shown), which provides high quality printing surface, which does not need additional cleaning. In addition to this, the design of the extruder is such that it can change the direction of the nozzle, which allows it to print not only straight, but also curved, spherical sections.

Embodiment 2

Figure 3:
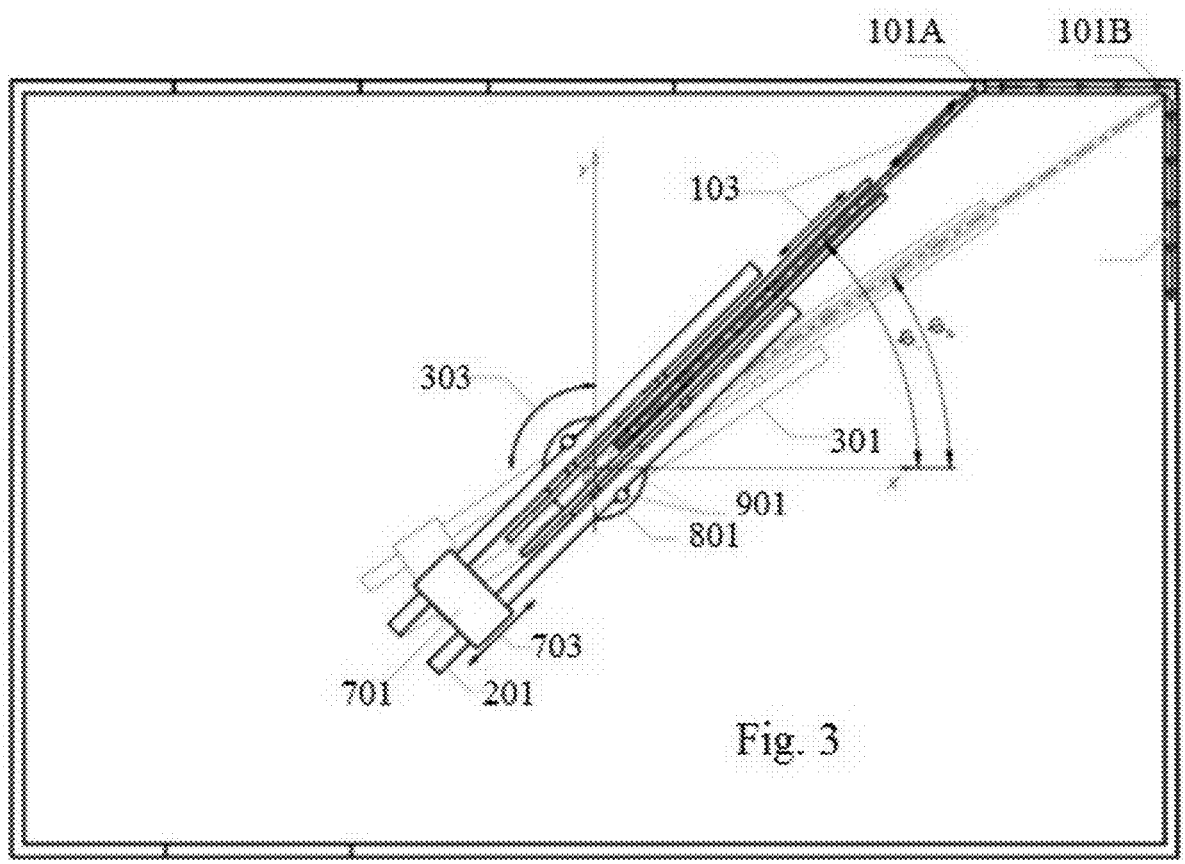
FIG. 3 shows operation of the 3D printer in the X and Y plane.
Figure 4:
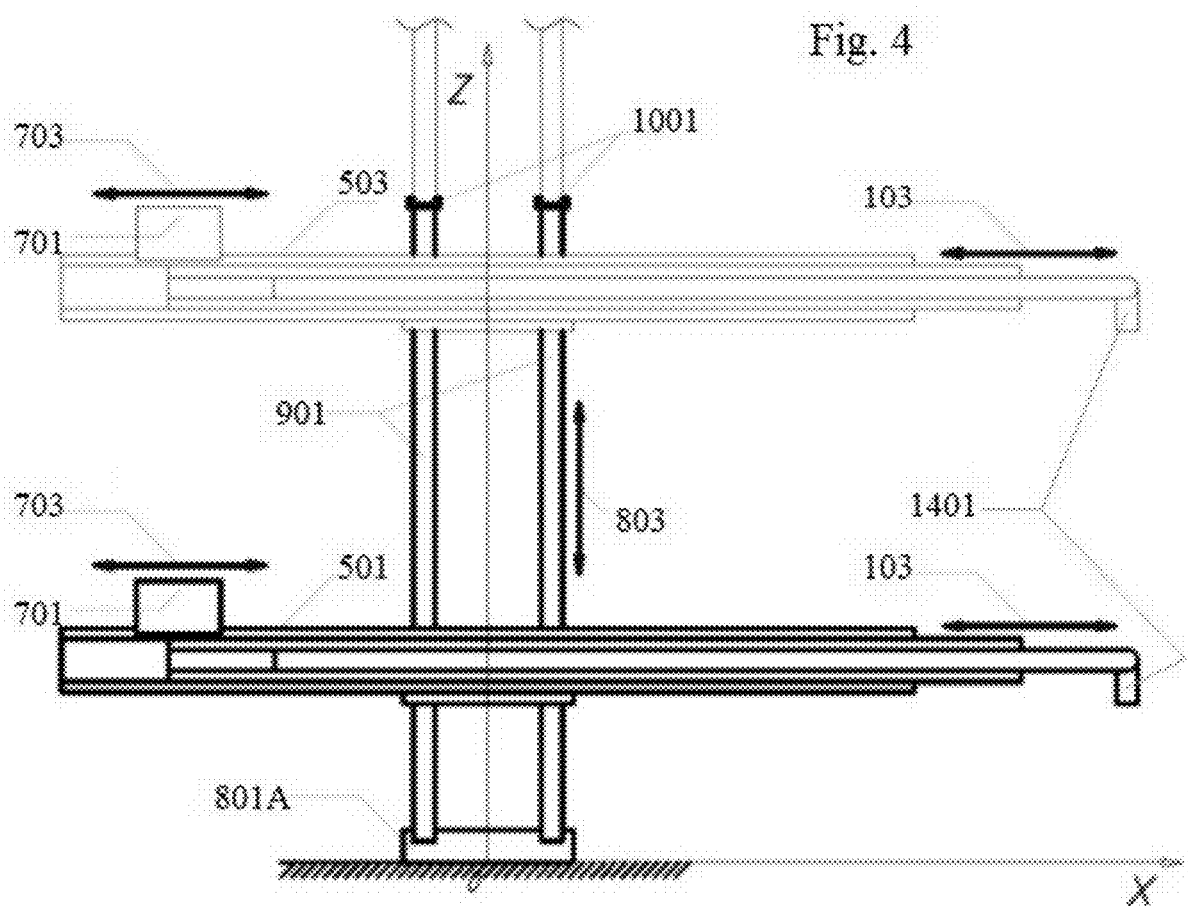
FIG. 4 shows operation of an alternative embodiment of the 3D printer in the X and Z plane.

Referring to FIG. 3 and FIG. 4, in addition to the translational 103 and rotational 303 motion in the X and V plane, the device carries out translational motions 803 along the Z axis during the printing, process, as a result of which the extruder 1401 can be raised and lowered, taking up positions at 501 or 503, respectively. The height of the extruder 1401 is determined in the XOZ plane by its applicate (its coordinate on the Z axis), or by the distance from it to the XOY plane in space. In a preferred embodiment the design allows printing a construction, encompassing the surroundings out to a radius of 20 meters, with center at the point where coordinates start. In alternative embodiments the radius is greater than 20 meters.

The rotation mechanism 801A is located in the base of the whole construction, the 3D printer, wherein during the printing process, the extendable boom arm 201 with telescoping extendable sections 301 and all nodes connected to it (counterweight mechanism 701, extruder 1401, etc.) rotate, as does the lift mechanism 901, presented in the form of a truss.

The device does not need its base to be anchored to a support, since it includes a counterweight mechanism 701, which corrects the overall center of mass during extendable boom arm movements 103 such that it coincides with the axis of rotation Z. This correction is performed by the movement of the load of the counterweight mechanism 701 in the specified direction 703.

Rotation mechanism 801A is located in the base of the construction, the 3D printer, providing:
1. Transmitting the electrical signal from control node to the motors;
2. Feeding a dry mixture into a combination concrete mixture and pump 2101 (FIG. 5) to the extruder 1401; and
3. Transmitting miscellaneous communications from the base to the rotating extendable boom arm 201.

Feeding of the solution is implemented using a rotary connector, and in the connector assembly using sliding contacts—graphite brushes and brass whiskers slide along gold-plated rings, which allows rotation of the turning part in any direction an unlimited number of times.

On the print head—extruder 1401 has a special rotary trowel device (not shown), which provides high quality printing surface, which does not need additional cleaning. In addition to this, the design of the extruder is such that it can change the direction of the nozzle, which allows it to print not only straight, but also curved, spherical sections.

The lift mechanism consists of truss 901, mounted on the rotation mechanism 801A. 503 extendable boom arm 201 with telescoping extendable sections 301 and all nodes touching it (counterweight mechanism 701, extruder 1401, etc.) perform necessary movements 803 along this truss 901. Special mounts 1001 on the end of the truss 901 allow building up of the truss, as a result of which it is possible to print second and subsequent floors of a building, the quantity of which depends on device dimensions.

Figure 5:
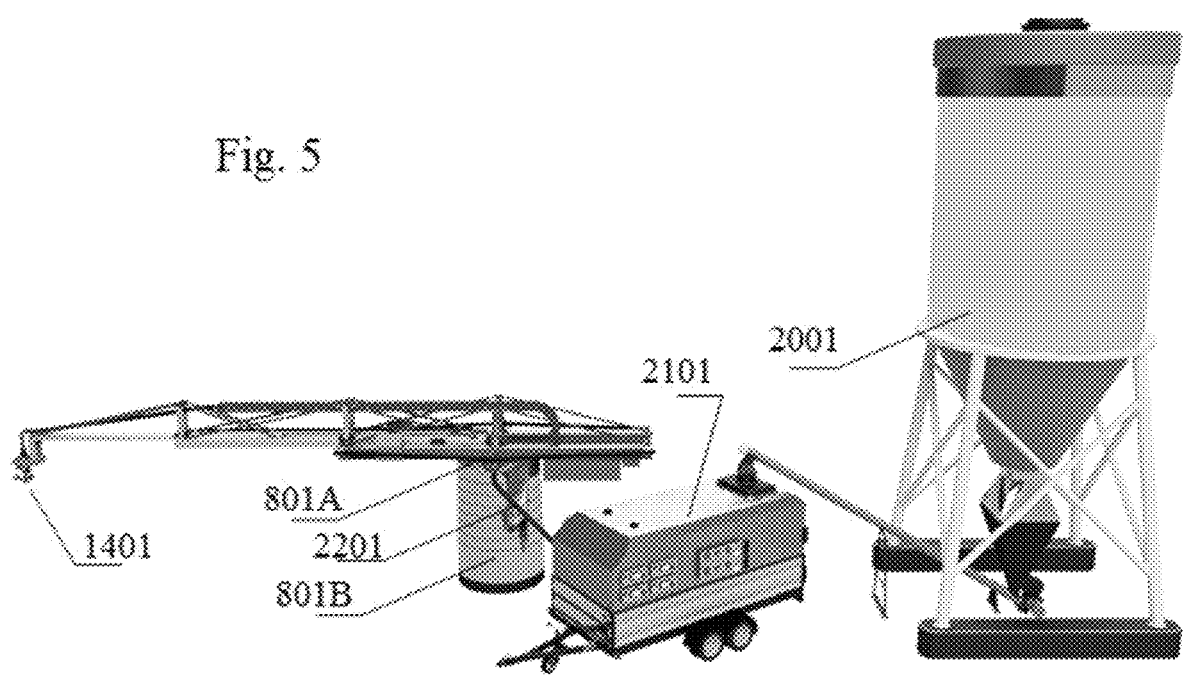
FIG. 5 shows the 3D printer system as a whole.
Figure 6:
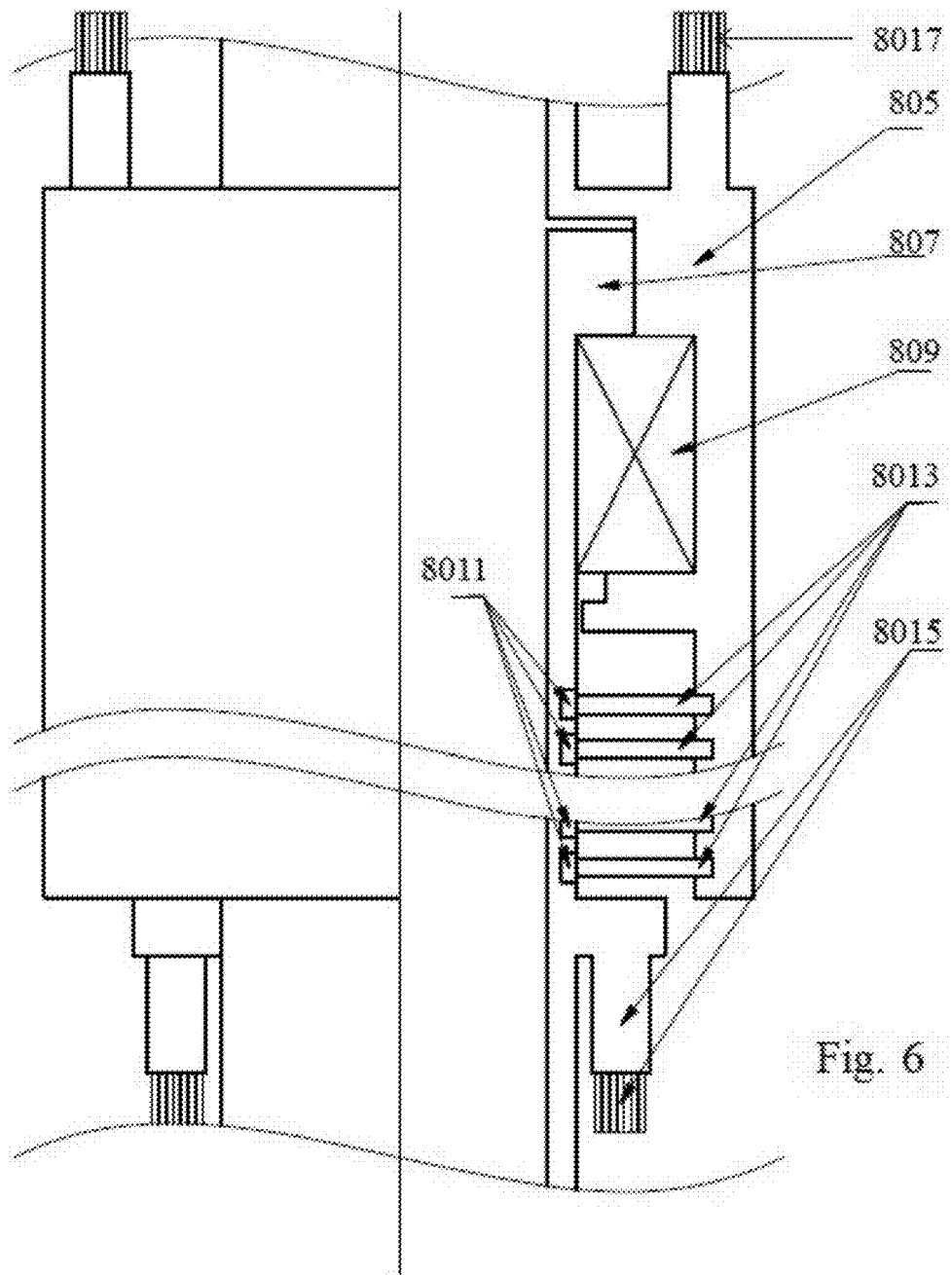
FIG. 6 shows additional details of the rotation mechanism.
Figure 7:
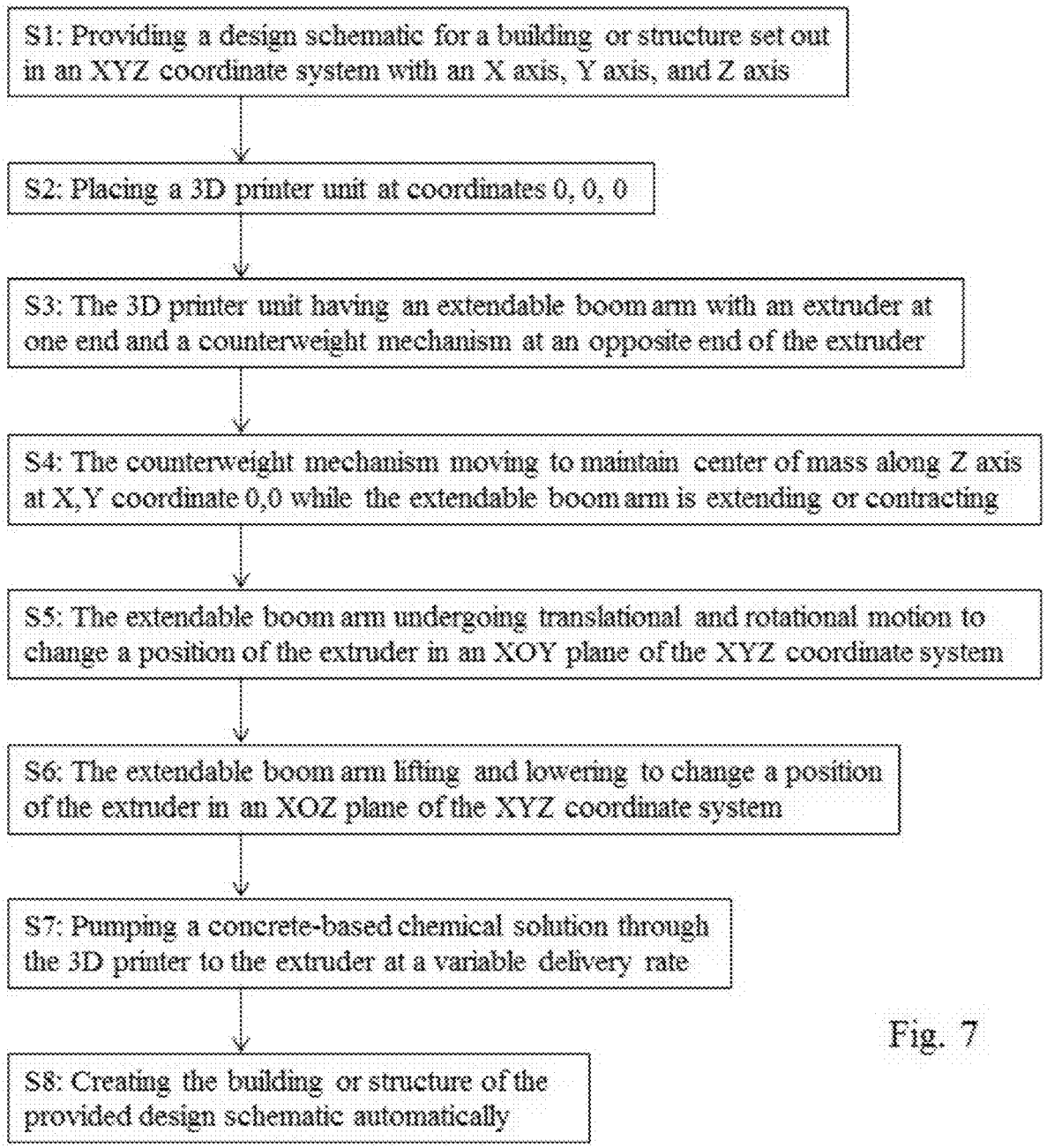
FIG. 7 shows a flow chart of a method of operating the 3D printer.

Referring to FIG. 5, and regarding both embodiments 1 and 2. Rotation mechanism 801A is connected to combination concrete mixer and pump 2101 by connection hose or pipe 2201. Combination concrete mixer and pump 2101 contains pump control systems to change the pressure and flow rate of the concrete-based chemical solution. Combination concrete mixer and pump 2101 is connected to dry mixture supply 2001. The dry mixture supply 2001 can be a storage unit (as shown) or could be a transport truck that pours its content into a trough or other feeding unit for combination concrete mixer and pump 2101. Dry concrete-based chemical is stored in the dry mixture supply 2001 which is then brought into the combination concrete mixer and pump 2101 where the dry concrete-based chemical is mixed with a predetermined proportion of water to form the concrete-based chemical solution and then pumped by the combination concrete mixer and pump 2101 through the 3D printer to the extruder 1401.

Concrete-based chemical solution is under an operational pressure of 40 bars into a special hose for abrasive materials (such as concrete) 2201. Supply combination concrete mixer and pump 2101 is either gerotor or piston type. Combination concrete mixer and pump 2101 is synchronized with the 3D primer and provides solution both fast and precise, regulating supply volume from 0 to 120 liters per minute. Extruder 1401 does not move with a constant trajectory speed, it slows down on corners when it changes movement direction to avoid vibrations. Thus when extrusion head slows down or speeds up concrete-based chemical solution supply volume varies in accordance with software control.

The control unit for the 3D printer and combination concrete mixer and pump 2101 can be housed in the base of the 3D printer (801B embodiment 1, 801A embodiment 2), and the extendable boom arm 201, in an ancillary unit such as the combination concrete mixer and pump 2101, or in another ancillary control unit (not shown).

Embodiment 3

Operation of the 3D printer is carried out according to the following method: Step 1: providing a given design schematic for the building or structure set out in an XYZ coordinate system with an X axis, Y axis, and Z axis. Step 2: placing: a 3D printer unit at coordinates 0, 0, 0. Step 3: the 3D printer unit having an extendable boom arm with an extruder at one end and a counterweight mechanism at an opposite end of the extruder. Step 4: the counterweight mechanism moving to maintain center of mass along Z axis at X,Y coordinate 0, 0 while the extendable boom arm is extending or contracting, Step 5: the extendable boom arm undergoing translational and rotational motion to change a position of the extruder in an XOY plane of the XYZ coordinate system. Step 6: the extendable boom arm lifting and lowering to change a position of the extruder in an XOZ plane of the XYZ coordinate system. Step 7: pumping a concrete-based chemical solution through the 3D printer to the extruder at a variable delivery rate. Step 8: creating the building or structure of the provided design schematic automatically.

Method of Operation:

A method of operation of the 3D printer involves: Step 1: providing a given design schematic for the building or structure set out in an XYZ coordinate system with an X axis, Y axis, and Z axis. Step 2: placing a 3D printer unit at coordinates 0, 0, 0, Step the 3D printer unit having an extendable boom arm with an extruder at one end and a counterweight mechanism at an opposite end of the extruder. Step 4: the counterweight mechanism moving to maintain center of mass along Z axis at X,Y coordinate 0, 0 while the extendable boom arm is extending or contracting. Step 5: the extendable boom arm undergoing translational and rotational motion to change a position of the extruder in an XOY plane of the XYZ coordinate system. Step 6: the extendable boom arm lifting and lowering to change a position of the extruder in an XOZ plane of the XYZ coordinate system. Step 7: pumping a concrete-based chemical solution through the 3D printer to the extruder at a variable delivery rate. Step 8: creating the building or structure of the provided design schematic automatically.

Rotation Mechanism:

The rotation mechanism 801A has an outer housing 805 and an inner housing 807 with a bearing unit 809 between outer housing 805 and inner housing 807. The inner housing 807 and outer housing 805 both surround the concrete based chemical solution feed pipe (not shown). Mounted to the inner case are contactor rings 8011. The contactor rings 8011 are in electrically conductive contact with contactor antennae 8013 that extend from outer housing 805. The contactor rings 8011 and contactor antennae 8013 allow for power and operational commands for the 3D printer to be transmitted. The inner housing end 8015 is where power and control signals are provided to the 3D printer as a whole. The power and control signals pass through the inner case end which is electrically connected to the contactor rings 8011 and then to the contactor antennae 8013 which is electrically connected to outer housing end 8017.

Bearing unit 809 is in direct contact with the concrete based chemical solution feed pipe (not shown) and provides the bearings that give outer housing 805 and inner housing 807 the ability to rotate around the concrete based chemical solution feed pipe. The concrete based chemical solution feed pipe connects to connection hose or pipe 2201.

The device allows for the transmission of fluid through a sealed pipe while rotating the outer housing 805 and the inner housing 807 in different directions with respect to a single axis and ensures the transfer of the electrical signal during operation from the base of the 3D printer to the top of the 3D printer through the rotation mechanism 801A through the contactor rings 8011 and contactor antennae 8013.

The pipe through which flows a liquid (mixture) is formed by two bodies—the outer housing 805 and inner housing 807, which rotate freely relative to each other. The ability to rotate freely relative to each other is provided by the bearing unit 809. The electrical signal is transmitted from one part to another by sliding contacts. On the inner housing 807 located a contactor ring 8011 which connect to contactor antennae 8013. Contactor antennae 8013 mounted in the outer housing 805. From contactor rings 8011 electrical signal is fed through the inner housing 807 at the inner housing end 8015. From contactor antennae 8013 signal is fed through the outer housing 805 to another outer housing end 8017. The contactor rings 8011 encircle inner housing 807.

Transfer of the liquid and signals is thereby available in rotation in one enclosure, and in different directions, and in a static position. Location of the rings and the contactor antennae may be both in the description above, and vice versa contactor ring 8011 arranged in the outer housing 805, and the contactor antennae 8013 located in the inner housing 807 in an alternative embodiment of the invention. The contactor rings 2011 are mounted to non-conductive inserts (not shown) and are not in direct electrical contact with the inner housing 807. The contactor antennae 8013 are mounted to non-conductive inserts (not shown) and are not in direct electrical contact with the outer housing 805.

Contactor antennae 8013 extend from outer housing 805 to the contactor rings 8011 on inner housing 807 acting as electrical contact, brushes and allowing for electrical signals and power to be transferred from contactor rings 8011 to contactor antennae 8013 much like power is transferred in an electrical motor using brushes.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A 3D printer for printing buildings and structures, comprising:
   a. a base;
   b. wherein the base has a telescoping-type lift mechanism;
   c. a rotation mechanism coupled to the telescoping-type lift mechanism so that a height of the 3D printer connected to the rotation mechanism only can be adjusted in an XOZ plane;
   d. wherein the base and the telescoping-type lift mechanism do not rotate;
   e. an extendable boom arm having telescoping extendable sections mounted to the rotation mechanism;
   f. the extendable boom arm being capable of translational and rotational motion in an XOY plane;
   g. an extruder at the end of the telescoping extendable sections for extruding a concrete-based chemical solution;
   h. wherein the 3D printer automatically prints a building or a structure based on a given design schematic;
   wherein:
   the rotation mechanism has an inner housing and an outer housing which surround a concrete based chemical solution feed pipe and have a bearing unit between the inner housing and outer housing allowing the inner housing and outer housing to freely rotate around each other;
   mounted to the inner housing are a plurality of contactor rings in electrical communication with a plurality of contactor antennae that are mounted to the outer housing;
   the inner housing has an electrical terminal that is an inner housing end which is in electrical contact with the plurality of contactor rings;
   the plurality of contactor rings are mounted to non-conductive inserts and are not in direct electrical contact with the inner housing;
   the outer housing has an electrical terminal that is an outer housing end which is in electrical contact with the plurality of contactor antennae; and
   the plurality of antennae are mounted to non-conductive inserts and are not in direct electrical contact with the outer housing.

2. The 3D printer for printing buildings and structures of claim 1, wherein the extendable boom arm has a counterweight mechanism, on an opposite end of the extendable boom arm from the extruder, a position of the counterweight mechanism is automatically adjusted so a center of mass of the 3D printer coincides with an axis of rotation of the 3D printer.

3. The 3D printer for printing buildings and structures of claim 1, wherein the extendable boom arm having the telescoping extendable sections has a maximum operating radius of 20 meters.

4. The 3D printer for printing buildings and structures of claim 1, wherein the concrete-based chemical solution is pumped through the rotation mechanism, then through the extendable boom arm, then through the telescoping extendable sections and finally through the extruder by a pumping unit connected to the rotation mechanism by a pipe or a hose.

5. The 3D printer for printing buildings and structures of claim 4, wherein the concrete chemical solution is under an operational pressure of up to 40 bars.

6. The 3D printer for printing buildings and structures of claim 4, wherein the concrete chemical solution is regulated between 0 to 120 liters per minute for extrusion.

7. The 3D printer for printing buildings and structures of claim 4, wherein a flow rate of the concrete chemical solution varies in relationship to a trajectory of the extruder changing.

8. The 3D printer for printing buildings and structures of claim 4, wherein the 3D printer and the pumping unit are controlled by a control unit housed in the base of the 3D printer, the extendable boom arm, the pumping unit, or in a separate ancillary control unit.

9. The 3D printer for printing buildings and structures of claim 4, wherein the concrete-based chemical solution is stored in a storage unit, or provided by a transport truck that pours its contents into a trough or a feeding unit for the pumping unit.

* * * * *